Dec. 16, 1941.  F. P. GRUTZNER  2,266,193
HEATING SYSTEM
Filed July 22, 1939  2 Sheets-Sheet 1

INVENTOR
FRITZ PAUL GRUTZNER
BY Paul L. Keokuk
ATTORNEY

Dec. 16, 1941.  F. P. GRUTZNER  2,266,193
HEATING SYSTEM
Filed July 22, 1939  2 Sheets-Sheet 2

INVENTOR
FRITZ PAUL GRUTZNER
BY Paul L. Kroker
ATTORNEY

Patented Dec. 16, 1941

2,266,193

UNITED STATES PATENT OFFICE 2,266,193

HEATING SYSTEM

Fritz Paul Grutzner, Beloit, Wis., assignor to Fairbanks, Morse & Co., Chicago, Ill., a corporation of Illinois Application July 22, 1939, Serial No. 285,871

10 Claims. (Cl. 237—12.1)

This invention relates to heating systems for recovering and utilizing waste heat from internal combustion engines, and more particularly to improved methods of and means for recovering and utilizing heat from the exhaust discharge, and cooling system of an internal combustion engine.

This invention is well adapted for application in buildings, ships, and similar structures where there is a demand for power, space heating and hot service water. The subject matter of this application is a continuation in part of my co-pending application for systems for Recovering and utilizing waste heat, filed July 31, 1937 and bearing Serial No. 156,652, which application has since matured into Letters Patent No. 2,208,157. The instant application further, contains subject matter similar to that of my co-pending application for Heating and ventilating systems, bearing Serial No. 85,272, filed June 15, 1936, and since matured into Letters Patent No. 2,189,895.

In accordance with the foregoing, the principal purpose of the invention is to provide a system for recovering waste heat produced in the operation of an internal combustion engine and for utilizing the heat recovered for either or both space heating and heating of service water.

Among other objects may be noted the provision of a system which is positive and automatic in its function to attain the purposes of the foregoing object, and one which is operable independently of power demands on the engine; the system including, also, mechanism of thermostatically controlled type, operable independently to regulate the temperature of the engine jacket water in a manner to maintain proper engine cooling.

A further object is to provide a system for the purpose described, in which the elements comprising the system are so arranged as to attain a markedly improved and a more efficient system of waste heat-recovery from an internal combustion engine.

Figure 1:
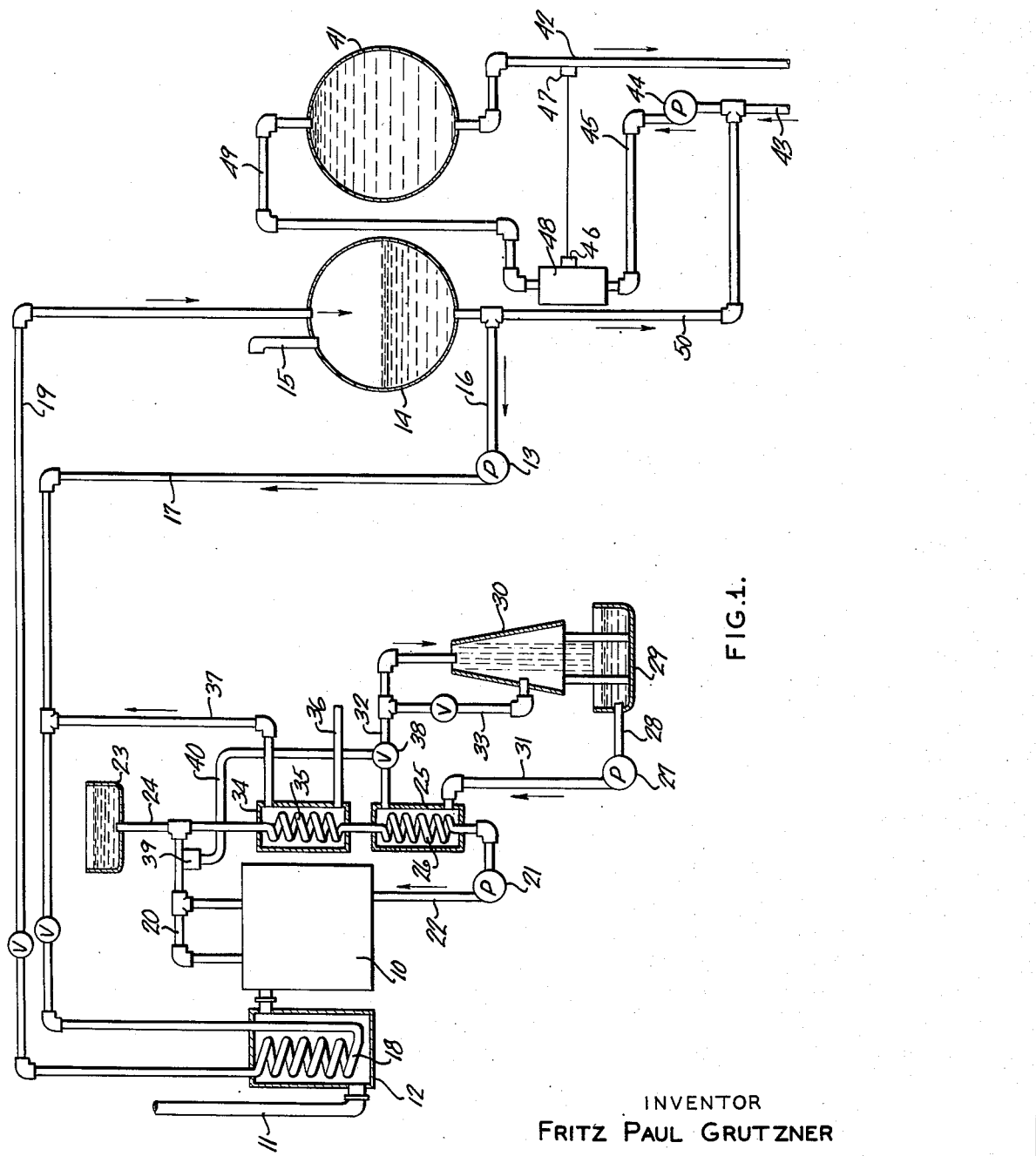
Figure 2:
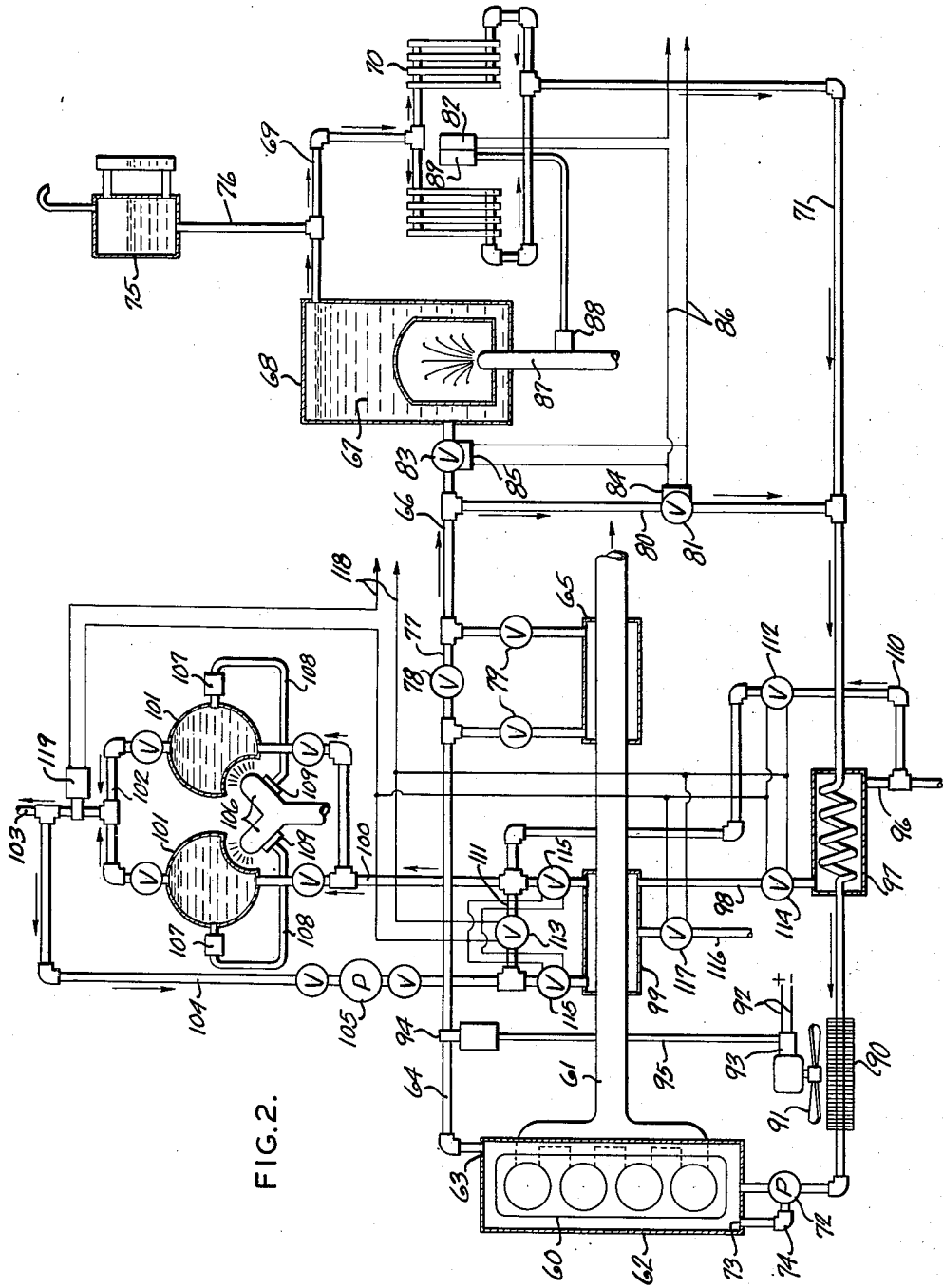

Numerous other objects and advantages of the system will appear from the description, and from the drawings wherein:

Fig. 1 is a diagrammatic illustration of one embodiment of the invention, and Fig. 2 is a diagrammatic illustration of another embodiment thereof.

Referring now by suitable characters of reference, to Fig. 1 which illustrates in a diagrammatic manner, one form of my invention as utilized in conjunction with a space heating system, 10 designates generally, an internal combustion engine preferably of Diesel type, the engine including an exhaust discharge conduit 11 with which is associated a heat-exchanger 12. The heat-exchanger serves to heat service water which is circulated by a pump 13 in a hot water service system including a reservoir or storage tank 14 which is open to atmosphere through an overflow pipe 15. A pipe 16 extends from the lower portion of the tank to the pump inlet, while to the pump outlet is connected a pipe 17 which is extended to a coil 18 in the exhaust heat-exchanger, wherein the service water is heated by the engine exhaust gases passing over and about the coil. From the heat-exchanger coil 18, the service water is returned to the tank 14 through a pipe 19. The water pressure in the system just described is determined by the elevation of the tank 14 with respect to the remainder of the circuit, and in the present example, the tank elevation is preferably such as to attain a pressure of about 30 pounds in the system.

The cooling system for the engine which is of jacket cooled type, is comprised of a closed-circuit jacket water circulating system including a pipe 20 connected to the jacket outlet and extending to the inlet of an engine driven pump 21, the pump outlet in turn being connected to the jacket inlet by a pipe 22. An expansion tank 23 providing make-up water for the jacket system, is connected by a pipe 24 to the pipe 20, the tank being arranged so as to provide a low pressure-head on the circulating jacket cooling water. The provision of a low pressure-head serves to minimize leakage at the pipe joints, as well as internally of the engine.

The jacket water is cooled in part by a flow of cold water in heat-exchange relation to the jacket water, through a heat-exchanger 25 including a coil 26 in circuit with the jacket water pipe 20. Cold water is circulated by a pump 27 having its inlet connected through a pipe 28, to a well or sump 29 located below a cooling tower 30. The pump outlet is connected with the heat-exchanger 25 by a pipe 31, while a pipe 32 returns the water from the exchanger to the top portion of the cooling tower. The water heated by the exchanger 25, travels downwardly through the cooling tower, whereby it is cooled, and thence collects in the sump 29 for re-circulation by pump 27. A valve-controlled by-pass 33, connected between the pipe 32 and a lower portion of the cooling tower, serves to provide for a cooling of the water through only the lower portion of the tower, whereby to reduce the cooling effect thereof, as during cold weather or winter operation of the engine.

The jacket water is further cooled by a second heat-exchanger 34 including a coil 35 associated with the jacket water pipe 29. Make-up water for the service system is circulated through this heat-exchanger from a suitable source, as a city water main or well (not shown), the water being conducted from the source to the heat-exchanger through a pipe 36, and thence conducted to the service water pipe 17, as by a pipe 37. The flow of cold water through the heat-exchanger 34 and into the service water system is preferably constant, and is regulated by any suitable valve means (not shown) so that the rate of flow will be substantially equal to the average daily rate of service water consumption.

The temperature of the engine cooling water is regulated so as not to exceed a predetermined maximum value, say for example, a temperature of 140 degrees F. at the jacket outlet. For this purpose, it is preferred to interpose in the conduit 32 a valve 38 which is operated by a thermostat 39 preferably of Sylphon type, associated with the jacket outlet pipe 29 and connected to valve 38 by a fluid pipe 40. The thermostat operated valve serves to control the rate of water flow through the jacket water heat-exchanger 25 and the cooling tower circuit, the rate of flow being increased as the jacket water temperature tends to rise above the desired limit of 140 degrees, whereby to restore the temperature condition of the jacket water to that desired for normal operation of the engine.

From the foregoing, it will be observed that the service water circulated in the described closed system including the storage tank 14 and the engine exhaust heat-exchanger 12, is heated by passage through this heat-exchanger, and is further heated through the addition to the circulating system, of make-up water flowing from a suitable source to the system, through the heat-exchanger 34 by which it is heated. Service withdrawal of hot water from tank 14 is effected in response to a service demand, as will be presently described.

The arrangement of Fig. 1 includes by preference, a space heating system of a hot water type, the system being comprised of a hot water storage tank or receiver 41, a tank outlet header 42 to which are connected space heating devices such as radiators (not shown), and hot water service outlets such as faucets (not shown), and a return header 43 connected to the inlet of a circulation pump 44. A pipe 45 extends from the pump outlet to a heating unit 48 which may be of electric, oil or other desired type. From this heater, the hot water is delivered through pipe 49 to the storage tank 41. Tank 41 is by preference sealed from atmosphere, and is at all times completely filled with hot water under a predetermined pressure. As indicated broadly, the heater 48 may be controlled automatically in response to the temperature of the water in header 42. For this purpose, a heater control device 46 of any suitable type is operatively associated with heater 48, and is controlled by a thermostat 47 associated with header 42. The system just described is adapted for distributing to space heating elements, hot water heated as described and delivered to tank 41 for circulation therefrom. The space heating system is adapted also, in a manner now to appear, for delivering hot water for service use, the service water being taken from the service water storage tank 14 and delivered to the service outlets through the space heating conduit system.

Accordingly, there is connected between the outlet pipe 16 of the service water tank and the return pipe 43 of the space heating system, a pipe 50 which is connected to pipe 43 preferably near the connection thereof to the inlet of circulation pump 44. The pressure of about 30 pounds existing in the service water system, as determined by the elevation of tank 14, provides, through the pipe 50 interconnecting the service water and space heating water systems, a static pressure head of approximately 30 pounds in the space heating system. Hence, when there is no demand for service water, there will be substantially no flow of service water from tank 14 through pipe 50 and into the space heating water mains, by reason of the fact that the storage tank 41 and the closed system of delivery and return pipes associated therewith, are at all times completely filled with water. However, upon a demand for hot service water, as when a hot water faucet connected to header 42 is opened, this immediately reduces the volume of water in the space heating system. Responsive to this reduction in volume of water in the space heating system, make-up water flows into the system from service water storage tank 14. This inflow of make-up water will continue during the demand for hot service water, and will cease only after the service water demand has ceased and the tank 41 and associated circulating system is again completely filled with water.

Thus it will be observed that the hot water service system does not function to supply hot water for space heating purposes, but delivers hot water to the space heating system only in such quantity as to make up the hot water discharged therefrom upon service water demand. It is also to be noted that in the event the volume of hot water in the service water system is insufficient to supply a maximum demand for service water, hot water from the space heating system will automatically make up the excess service demand, until such time as the service demand is reduced to normal requirements.

As long as the engine loading is fairly constant, the temperature of the service water collecting in tank 14 and circulated in the system as described, will remain substantially constant. Also, even though the engine loading may vary, the service water temperature will remain substantially constant, by reason of the control of the jacket water temperature as heretofore described, which serves to maintain fairly constant, the temperature of the water admitted to the service water system through pipe 37, this water being heated by passage through the jacket water heat-exchanger 34.

Fig. 2 illustrates diagrammatically, another form of my improved system for utilizing waste heat from the exhaust and jacket cooling circuits of an internal combustion engine, for space heating and service water heating purposes. In the drawing, 60 designates an internal combustion engine which is preferably of Diesel type. The engine is provided with an exhaust discharge conduit 61 and a water jacket shown diagrammatically at 62. Engine cooling water, heated in the engine jacket 62, is conducted from the jacket outlet 63 through a conduit or pipe 64 to an exhaust heat exchanger 65 functionally associated with the engine exhaust conduit 61. The water is further heated in the exhaust heat exchanger, by thermal transfer of exhaust heat thereto in a well known manner, and thence is conducted through a pipe 66 to the hot water compartment 67 of an oil, gas or other suitable type heater 68. From this heater, the hot engine jacket water is conducted through a header pipe 69 to space heating radiators 70, two being illustrated in the present example, although any number may be utilized. These radiators are preferably shown in a parallel arrangement between the inlet header 69 and a return header 71, which returns the jacket water to the inlet of a circulation pump 72 which is, by preference, driven by engine 60. The pump discharge is connected to the inlet 73 of the engine water jacket through a pipe 74. An expansion tank 75 for the jacket water circuit is, by preference, connected through pipe 76 to the header 69, the elevation of this tank being such as to effect a predetermined, desired static pressure-head on the circulating jacket water.

Located adjacent the exhaust heat-exchanger 65 and connected between the pipes 64 and 66, is a by-pass pipe 77 which is controlled by a valve 78. Also, valves 79 are associated in controlling relation to pipes 64 and 66, these valves being disposed between the by-pass and the heat exchanger, in the manner shown. When the space heating demand is a minimum, or when for any other reason it is desired to by-pass the jacket water about the exhaust heater 65, valve 78 is opened and both valves 79 closed.

To enable the auxiliary heater 68 and space heating radiators 70 to be cut out of circuit with the jacket water system, as when the space heating demand is a minimum or for any other reason, a by-pass pipe 80 is provided in circuit between the pipe 66 and the return header 71. This by-pass is controlled by a valve 81 associated therewith, the valve being by preference, automatically operated by a thermostat 82 which is so located with respect to the space to be heated, as to be responsive to temperature conditions existing in such space. Thermostat 82 is utilized also, to control the operation of a valve 83 in pipe 66, the location of this valve being between the heater 68 and the connection of by-pass 80 to pipe 66.

It is preferred in the present example, to operate valve 81 by a motor 84, and valve 83 by a motor 85, the motors being connected in parallel circuit relation to an energizing circuit 86 which includes the thermostat 82 in circuit controlling relation thereto. The motors 84 and 85 are preferably of a type capable of actuating the valves to full-open or full-closed positions, or to one or more intermediate, partly-open positions, as energized through the control thermostat 82. The thermostat is regulated so that it will close the circuit to the valve motors when the temperature in the space to be heated attains 72 degrees F. The arrangement is such that at this temperature, motor 84 will operate to fully close by-pass valve 81, while motor 85 will operate to fully open valve 83. Thus the by-pass will be closed, and the engine jacket water constrained to circulate through open valve 83, the heater 68 and space heating radiators 70. When the temperature of the space to be heated attains 74 degrees F., the thermostat 82 set to operate at this temperature, again closes the motor energizing circuit to effect operation of the respective valve motors to actuate valve 81 to a partly open position, and valve 83 to a partly closed position. Further, when the space temperature attains 76 degrees F., thermostat 82 also set to operate at this temperature, then functions to close the motor energizing circuit, whereby the respective motors operate valve 81 to a fully open position and valve 83 to a fully closed position. As the space temperature decreases, through the range of 76 to 72 degrees, the valves 81 and 83 will be operated as above described, but in the reverse order.

For space heating purposes, the jacket water may be heated by heater 68 to augment the heating of the water by the engine. Accordingly, heater 68 includes a fuel burner 87 which may utilize oil or gas as fuel, ignition of the burner being controlled by a device 88 of any suitable type, adapted for starting and stopping the fuel burner. Operation of the control device 88 is preferably automatically controlled by a thermostat 89 which may be of Sylphon type, as shown. It is preferred to locate thermostat 89 relatively close to thermostat 82, so that both may respond to the same temperature conditions of the space to be heated. The thermostat 89 is regulated to operate the device 88 to start the burner 87 when the space temperature attains 68 degrees F., whereby to heat the water flowing through the heater 68. When the space temperature rises to 70 degrees F., the thermostat operates device 88 to shut off the fuel burner. It is to be understood that the auxiliary heater 68 fired by burner 87, serves mainly to augment the heating of the jacket water in those instances where the space heating demand exceeds the capacity of the engine to heat the jacket water sufficiently to meet such demand.

As in the arrangement first described, the temperature of the jacket water is preferably limited so as not to exceed a predetermined value. To this end, there is suitably disposed in circuit with the jacket water return header 71, an auxiliary radiator 90, and associated with the radiator is a motor operated blower 91, the motor of which is supplied with electric power from mains 92. Energization of the motor is controlled by a switch 93 which is operated by a thermostat 94 thermally associated with the jacket outlet pipe 64. The thermostat is preferably of Sylphon type, connected to the switch 93 through a fluid tube 95. The function of the thermostat, blower and radiator is such that when the outlet temperature of the jacket water exceeds a predetermined maximum, the thermostat 94 effects a closure of switch 93 to operate the motor-blower. Thus a stream of air is directed through the radiator 90, whereby to cool the jacket water flowing therethrough. The thermostatically controlled motor-blower and associated radiator serve to augment the cooling of the jacket water by the space heating radiators 70, this occurring only when the temperature of the jacket water leaving the engine jackets exceeds a predetermined maximum. However, in the normal operation of the system, the space heating radiators 70 and/or the service water heating means later to be described, will be effective to cool the jacket water sufficiently so that the temperature thereof, upon discharge from the engine jacket, will be below the predetermined maximum limit.

Turning now to the service water heating system associated with the engine 60, service water from a suitable source of supply, such as a city water main (not shown), is conducted through branch pipe 96 to a heat-exchanger 97 thermally associated with the jacket water circulating system, as through a coil 98 in the circuit of the return header 71. The heat-exchanger 97 serves as a pre-heater for the service water. It will be noted that when the jacket water is by-passed about the radiators 70, substantially all of the jacket heat will be transferred to the service water by the heat-exchanger. From the heater 97 the service water is conducted through pipe 98 to an exhaust heat-exchanger 99 thermally associated with the engine exhaust conduit 61. The exhaust heater 99 is preferably disposed between the engine and the jacket water-exhaust heater 65, so that this heater may utilize to the fullest extent, the available heat of the exhaust gases to heat the service water.

The service water heated in the exhaust heater 99 is then conducted through a pipe 100 to one or more hot water reservoirs 101, two being shown in the present example. From these tanks, hot water may be drawn to consumption through an outlet header 102 to which is connected a service water header 103 leading to one or more points of hot water consumption (not shown).

It is preferred to provide a closed circulation system for the hot service water, with the closed system arranged so that it will receive service water from the city main only upon withdrawal of hot water from the system to consumption. Accordingly, there is provided between the service consumption header 103 and the exhaust heater 99, a pipe 104 which includes in circuit therewith, a pump 105 for maintaining circulation of the hot water in the closed system. Thus the closed system comprises the exhaust heater 99, pipe 100, the storage tanks 101, headers 102 and 103, and the pipe 104 including pump 105. The hot service water is normally circulated in the closed system, and when there is no service withdrawal of hot water, the pressure in the system is such as to prevent admission of service water from the city main. However, upon withdrawal of water to consumption, the pressure in the closed system is reduced, so that service water from the city main may then flow into the system in an amount sufficient to make up the volume withdrawn.

Auxiliary heating of the service water is provided for by burners 106 which are associated with the reservoirs 101 in a manner to heat the water in response to a demand therefor. Operation of the burners, which may be oil or gas fired, is controlled by thermostats 107, one being thermally associated with each reservoir 101. These thermostats may be of Sylphon type, operating through Sylphon tubes 108 to control burner operating devices 109 of any suitable type, associated with the burners. Both thermostats are regulated so as to initiate operation of the burners in response to the temperature of hot water in tanks 101 when the same falls to or below say 150 degrees F., whereupon the burners may augment the heating of the service water by the exhaust heater 99. Moreover, these burners may be utilized alone to heat the service water to the desired temperature, as for example, when the engine 60 is not in operation. The thermostats are further regulated to shut-off the burners when the temperature of the service water in reservoirs 101 attains or exceeds say 160 degrees F.

As a means for further controlling the heating of the service water, a by-pass arrangement is associated with the service water system, the arrangement being provided to relieve excessive heating of the service water in the instance when the engine 60 is in operation and there is no demand for hot service water, say for an extended period of time. In such case, continued circulation of service water in the closed circuit and through the exhaust heater 99 may result in an excessively high temperature of the service water, and if continued long enough, this temperature may even attain the boiling point. Accordingly, there is provided a by-pass pipe 110, connected between branch pipe 96 leading from the city main, and the exhaust heater outlet pipe 100. Also, a pipe 111 is connected between pipes 100 and 104, and serves in a manner presently to be described, to shunt the circulation of the service water about the exhaust heater 99. A valve 112 controls the by-pass 110, while a valve 113 serves to control the shunt pipe 111. Moreover, there is provided a valve 114 in the circuit of pipe 98 which conducts the service water from pre-heater 97 to the exhaust heater 99, and in addition, a valve 115 is provided for each of the pipes 100 and 104, these latter valves being positioned between the heater 99 and the shunt pipe 111. Also, the heater 99 has associated therewith, a drain connection 116 which is controlled by a valve 117, the purpose of the drain appearing later. In the present example, all of the valves above noted, are operated automatically and simultaneously, in response to temperature conditions of the service water flowing from the tanks 101 through the headers 102 and 103. The valves are by preference, of motor-actuated type, each having an actuating motor associated therewith. The motors are energized from a common energizing circuit, such as the mains 118 connected to a suitable generator or other source of electric current (not shown), the motors being arranged in parallel or shunt circuit relation, as will readily appear from the circuit connections shown. Energization of the valve motors is controlled by a thermostat 119 which is thermally associated with the supply header 103 so as to be operable responsively to the temperature of the service water flowing therethrough. The thermostat is connected in circuit-controlling relation to one side of the mains 118, as shown, whereby it may control the operation of all the valve motors simultaneously.

The initial operative condition of the several valves is such that valves 112, 113 and 117 are normally closed, while valve 114 and both valves 115 are normally open, whereby the by-pass 110, the shunt connection 111 and the exhaust heater drain 116 are all closed. Thus in this instance, service water from the city main or other source will be constrained to flow through the pre-heater 97 and the exhaust heater 99 to the tanks 101, upon a demand for such flow as heretofore described; while lacking such demand, the hot service water may be circulated in the heretofore described closed system including the exhaust heater 99.

However, there may arise from time to time, a condition of no demand for hot service water for extended periods of time, say while the engine 60 is in full operation and hence heating the service water through the agency of the exhaust heater 99. As a result, the temperature of the service water circulating in the closed system may rise to an undesirable extent. Accordingly, thermostat 119 is regulated so that it will operate to close the energizing circuit to the valve-motors when the service water temperature rises to say 190 degrees F. The motors then operate the several valves from their initial operative condition above noted, to the condition wherein valves 112, 113 and 117 are opened, and valves 114 and 115 closed. Thus, in this instance, it will be observed that by-pass connections 110 and 111 are opened, while the drain 116 is opened to permit the service water in exhaust heater 99 to flow to waste. Accordingly, the service water entering the system from the city main is by-passed about both heaters 97 and 99, and further the hot service water circulated in the closed circulating system which is now shunted about exhaust heater 99, is no longer heated thereby. Hence, in this manner, the temperature of the service water is controlled so as not to exceed substantially 190 degrees F. It will be noted that in the condition of the apparatus above described and resulting from the temperature of the service water attaining about 190 degrees, such temperature may be considerably reduced by service withdrawal from the system, which permits a make-up inflow of cold water directly to the tanks 101.

The provision of the drain 116 for exhaust heater 99 serves to remove water which would otherwise become trapped in the heater when the several by-passes are opened, as above described. In this connection, the exhaust heater 99 is preferably of a type which may be operated in a dry condition for long periods, without damage thereto. Also, the water space of the heater is preferably, relatively small, so that it may be quickly filled and as quickly emptied upon the proper occasion therefor, as pointed out above.

Thermostat 119 is further regulated so that it will effect a closure of the valve-motor energizing circuit when the service water temperature falls to 170 degrees F. When this occurs, the valve motors operate to return the valves to initial position heretofore noted, whereby the service water may again flow through the heaters 97 and 99.

It will be noted from the arrangement of Fig. 2, that the system is well adapted for utilizing the waste heat of the engine jacket water for space heating purposes, and the waste heat of the exhaust gases for heating service water. Moreover, through the pre-heater 97, some of the jacket heat may be thermally transferred to the service water, while a part or all of the exhaust heat may be utilized for space heating, as when the exhaust heater 99 is cut out of the service water circuit, leaving the exhaust heater 65 to transfer exhaust heat to the jacket water. Although not shown, it may be noted here that if desired, the valves 78 and 79 provided for selectively controlling flow of jacket water either through the exhaust heater 65 or through the heater shunt or by-pass 77, may be regulated automatically under control of the thermostat 94 in the jacket circuit 64. Also, under certain conditions of system installation and usage, it may be desirable to regulate these valves automatically in response to the temperature conditions prevailing in the space to be heated, as by rendering control thereof directly responsive to the room thermostat 82.

The several embodiments of the invention herein described fully attain the foregoing objects, and may be utilized to great advantage, to provide adequate heat for normal space heating and service water heating required by buildings, ships and the like, which have installed therein one or more internal combustion engines. Further, the systems illustrated are automatic in operation, and utilize apparatus readily available.

It is to be understood, of course, that while the several embodiments of the invention herein described, represent preferred arrangements, alterations or modifications in the elements and relative dispositions thereof may be made without departing from the spirit and scope of the invention, as defined by the appended claims.

I claim:

1. In a system of the type described, in combination with an internal combustion engine provided with an exhaust discharge conduit and a fluid jacket, a closed, engine cooling fluid circulating system in circuit with said jacket and including a plurality of heat transfer elements, a heat-exchanger functionally associated with said exhaust discharge conduit, a separate service water system in circuit with said heat-exchanger and one of said heat transfer element, and means including a thermostatic control device responsive to the temperature of the fluid circulating in said engine cooling fluid system, in control of another of said heat transfer elements, adapted for controlling the temperature of the fluid in said circulating system.

2. In a system of waste heat recovery of the character described, an internal combustion engine provided with an exhaust discharge conduit and a fluid jacket, a fluid circulating system associated with said jacket, heat-exchange means in circuit with said circulating system, a heat transfer element associated with said exhaust conduit, a closed service water circulating system independent of said jacket circulating system in heat exchange association with said heat transfer element, a source of service water supply, means for conducting service water from the source of supply, through said heat-exchange means and to said closed service water system, and thermostatically-controlled means independent of the service water system and responsive to the temperature of the fluid in said jacket circulating system, adapted for regulating the temperature of the fluid in said jacket system.

3. In a system of waste heat recovery, the combination of an internal combustion engine provided with a fluid jacket and an exhaust discharge conduit, a fluid circulating system in circuit with said jacket, separate, relatively spaced heat transfer elements functionally associated with said circulating system and said exhaust discharge conduit, a closed service water circulating system including in circuit therewith, one of said heat transfer elements, a source of service water supply, means provided for conducting service water from said source, through another of said heat transfer elements and to said closed service water system, and means including a thermostatic device in said jacket system and responsive to the temperature of the fluid circulating therein, arranged in heat transfer controlling relation to one of the heat transfer elements functionally associated with said fluid circulating system, adapted for regulating the temperature of the fluid in said jacket system.

4. In a waste heat recovery system of the character described, an internal combustion engine provided with an exhaust discharge conduit and a fluid jacket, a closed, fluid circulating system for said engine jacket, said system including in series relation therein, a plurality of heat transfer elements, a closed service water circulating system including a storage tank, a heat-exchange device thermally associated with said discharge conduit and connected in said service water system, a source of service water supply, means for conducting service water from said supply source through one of said heat transfer elements, to said closed service water system, and means including a thermostatic control device responsive to the temperature of the fluid circulating in said jacket system, associated with another of said heat transfer elements, adapted therewith, for regulating the temperature of the fluid in said jacket system.

5. In a system of the type described, an internal combustion engine provided with an exhaust discharge conduit and a water jacket, an engine cooling water circulating system in circuit with said jacket, fluid cooling means associated with said circulating system, including a control element responsive to the temperature of the water in said jacket system, a heat transfer element functionally associated with said exhaust conduit, a service water circulating system including a storage tank, in circuit with said heat transfer element, a second heat transfer element associated with said engine cooling water circulating system, a source of service water and means for conducting service water from said source through said second heat transfer element and to said service water system.

6. In a system of the type described, an internal combustion engine provided with an exhaust discharge conduit and a water jacket, a closed water circulating system in circuit with said jacket, fluid cooling means associated with said circulating system, a control for said fluid cooling means, including a thermostatic operating device responsive to the temperature of the water in said jacket system, a heat transfer element functionally associated with said discharge conduit, a closed service water system including a storage tank, in circuit with said heat transfer element, a second heat transfer element associated with said jacket water circulating system, a source of service water and means for conducting service water from said source through said second heat transfer element and to said service water system, a service water distribution system, and a connection between said distribution system and said service water circulating system.

7. In a system of the type described, an internal combustion engine of jacketed, water cooled type provided with an exhaust discharge conduit, an engine cooling water system in circuit with the engine jacket, heat-transfer elements connected in series in said jacket system, a heat exchange device functionally associated with said exhaust conduit, a service water heating system in thermal exchange relation to said heat exchange device, a source of service water supply, means for conducting service water from said source through one of said heat transfer elements, to said service water heating system, a fluid circulating system including a circulating pump, in circuit with another of said heat transfer elements, a circulation regulating means in said fluid circulating system, a control for said regulating means, responsive to the temperature of the water circulating in said jacket cooling system, said fluid circulating system serving to regulate the temperature of the water in said jacket system, a combined hot water space heating and service water distribution system, and a connection between said service water heating system and said space heating and distribution system, for admitting heated service water to said latter system.

8. In a waste heat recovery system of the character described, an internal combustion engine of water jacketed type provided with an exhaust discharge conduit, a low pressure engine cooling water system in circuit with the engine jackets, a pump included in said system for maintaining circulation of cooling water therein, heat transfer elements functionally associated with said cooling water system, a heat-exchange device in heat exchange relation to said exhaust conduit, a low pressure service water circulating system including a storage tank and piping in circuit with one of said heat transfer elements and said heat-exchange device, a pump for circulating service water in said service system, a fluid circulating system in circuit with another of said heat transfer elements and including a pump for circulating the fluid in said system, and circulation control means for said fluid system, including a thermostatic device responsive to the temperature of the water circulating in said jacket cooling system, effective to limit the maximum temperature of the water in said jacket system.

9. In a system of the type described, an internal combustion engine of jacketed, water cooled type provided with an exhaust discharge conduit, a closed, low pressure engine cooling water system in circuit with the engine jacket, said system including space heating radiator means and a service water heating element in series, a closed, circulating service water system including a storage tank and a circulating pump, a heat exchanger functionally associated with said exhaust conduit, and connected into the service water system, a source of service water supply, means for conducting service water from said source through said service water heating element, to said closed service water system, and thermostatically controlled, independently operable means associated with each of said systems and responsive to the temperatures of the water in said systems, provided for regulating the temperatures of the engine cooling water and the service water.

10. In a system of the type described, in combination with an internal combustion engine provided with an exhaust discharge conduit and a fluid jacket, a closed engine cooling water circulating system in circuit with said jacket and including a plurality of heat transfer elements, a heat-exchanger functionally associated with said exhaust discharge conduit, a service water system in circuit with said heat-exchanger, a source of service water supply, means for conducting service water from said source through one of said heat transfer elements, to said service water system, a motor-driven blower associated with another of said heat transfer elements, a control for said motor-driven blower, responsive to the temperature of the water in said engine cooling water system, said blower and associated heat transfer element being adapted for controlling the temperature of the jacket water in said system, and thermostatically-controlled by-pass means associated with said service water system, operable in response to a predetermined maximum temperature of the water in said service water system to by-pass service water conducted from said source to the service water system, about said one of said heat transfer elements and said heat-exchanger.

FRITZ PAUL GRUTZNER.